US012014684B2

(12) United States Patent
Liu et al.

(10) Patent No.: US 12,014,684 B2
(45) Date of Patent: Jun. 18, 2024

(54) PIXEL CIRCUIT, METHOD OF DRIVING PIXEL CIRCUIT, DISPLAY PANEL, AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Tingliang Liu, Beijing (CN); Lingtong Li, Beijing (CN); Huijuan Yang, Beijing (CN); Xiaoqing Shu, Beijing (CN); Liheng Wei, Beijing (CN); Maoying Liao, Beijing (CN); Yi Zhang, Beijing (CN); Yixuan Long, Beijing (CN); Nanhao Chen, Beijing (CN); Peng Xu, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/042,326

(22) PCT Filed: May 23, 2022

(86) PCT No.: PCT/CN2022/094429

§ 371 (c)(1),
(2) Date: Feb. 21, 2023

(87) PCT Pub. No.: WO2023/225787

PCT Pub. Date: Nov. 30, 2023

(65) Prior Publication Data

US 2023/0395025 A1 Dec. 7, 2023

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01)

(58) Field of Classification Search
CPC ......... G09G 3/3233; G09G 2300/0819; G09G 2310/08; G09G 2300/0842
See application file for complete search history.

(56) References Cited

U.S. PATENT DOCUMENTS 10,699,640 B2 6/2020 Zhou et al.
11,605,336 B2 3/2023 Yuan
(Continued)

FOREIGN PATENT DOCUMENTS

CN 107680537 A 2/2018
CN 108922474 A 11/2018
(Continued)

*Primary Examiner* — Muhammad N Edun
(74) *Attorney, Agent, or Firm* — Westman, Champlin & Koehler, P.A.

(57) ABSTRACT

Provided is a pixel circuit configured to drive, in an $X^{th}$ frame period, a light emitting device to emit light. The $X^{th}$ frame period includes Y data writing stages and Z light emitting stages, in which a $y^{th}$ data writing stage includes a first sub-stage to a third sub-stage. The pixel circuit includes: a driving transistor; a first reset module configured to transmit, in the first sub-stage, a first initialization signal to the driving transistor in response to a first scanning signal; a gating module configured to perform, in the second sub-stage, a threshold compensation on the driving transistor in response to a second scanning signal; and an input module configured to transmit, in the third sub-stage, a data signal to the driving transistor in response to a third scanning signal. X, Y, Z and y are positive integers, y≤Y, and Y≥Z.

19 Claims, 9 Drawing Sheets

(56) References Cited

U.S. PATENT DOCUMENTS

| | | | | |
|---|---|---|---|---|
| 2014/0111490 | A1* | 4/2014 | Lee | G11C 19/28 345/204 |
| 2018/0240400 | A1 | 8/2018 | Zhou et al. | |
| 2019/0355301 | A1* | 11/2019 | Lee | G09G 3/3275 |
| 2021/0280132 | A1* | 9/2021 | Gao | G09G 3/3233 |
| 2021/0383752 | A1* | 12/2021 | Yang | G09G 3/3233 |
| 2021/0407386 | A1* | 12/2021 | Li | G09G 3/3291 |
| 2022/0301490 | A1 | 9/2022 | Yuan | |
| 2023/0186839 | A1 | 6/2023 | Yuan | |
| 2023/0186840 | A1 | 6/2023 | Yuan | |
| 2023/0186841 | A1 | 6/2023 | Yuan | |

FOREIGN PATENT DOCUMENTS

| | | | |
|---|---|---|---|
| CN | 111710239 | A | 9/2020 |
| CN | 112614876 | A | 4/2021 |
| CN | 112951161 | A | 6/2021 |
| CN | 112992062 | A | 6/2021 |
| CN | 113140179 | A | 7/2021 |
| CN | 113436583 | A | 9/2021 |
| CN | 113707090 | A | 11/2021 |
| JP | 2005326793 | A | 11/2005 |
| JP | 2016038402 | A | 3/2016 |

* cited by examiner

PIXEL CIRCUIT, METHOD OF DRIVING PIXEL CIRCUIT, DISPLAY PANEL, AND DISPLAY DEVICE

CROSS REFERENCE TO RELATED APPLICATION(S)

This application is a Section 371 National Stage Application of International Application No. PCT/CN2022/094429, filed on May 23, 2022, entitled "PIXEL CIRCUIT, METHOD OF DRIVING PIXEL CIRCUIT, DISPLAY PANEL, AND DISPLAY DEVICE", the content of which is incorporated herein by reference in its entirety.

TECHNICAL FIELD

The present disclosure relates to a field of a display technology, in particular to a pixel circuit, a method of driving a pixel circuit, a display panel, and a display device.

BACKGROUND

Organic Light Emitting Diode (OLED) is an active light emitting display device, which has advantages of self-luminescence, wide viewing angle, high contrast, low power consumption, and very fast reaction. With a continuous development of the display technology, a display panel in which an OLED is used as a light emitting device and a signal control is performed by a thin film transistor (TFT) has become a mainstream product in a current display field.

In a pixel circuit in the display panel, a low temperature poly-silicon thin film transistor may be used, or an oxide thin film transistor may be used, or both the low temperature poly-silicon thin film transistor and the oxide thin film transistor may be used. An active layer of the low temperature poly-silicon thin film transistor is made of a low temperature poly-silicon (LTPS) material, and an active layer of the oxide thin film transistor is made of an oxide material. The low temperature poly-silicon thin film transistor has advantages of high mobility rate, fast charging or the like, while the oxide thin film transistor has advantages of low leakage current or the like.

Low Temperature Polycrystalline Oxide (LTPO) display panel refers to a display panel in which a low temperature poly-silicon thin film transistor and an oxide thin film transistor are integrated in a pixel circuit. Such display panel may make use of the advantages of the above-mentioned two thin film transistors to achieve a high resolution (e.g., PPI, Pixel Per Inch) and a driving at a low frequency, so that a power consumption may be reduced, and a display quality may be improved.

SUMMARY

The present disclosure provides a pixel circuit, a method of driving a pixel circuit, a display panel, and a display device.

According to a first aspect of the present disclosure, a pixel circuit is provided, the pixel circuit is configured to drive, in an $X^{th}$ frame period, a light emitting device electrically connected to the pixel circuit to emit light; the $X^{th}$ frame period includes Y data writing stages and Z light emitting stages, a $y^{th}$ data writing stage in the Y data writing stages includes a first sub-stage, a second sub-stage and a third sub-stage, and the pixel circuit includes: a driving transistor; a first reset module electrically connected to the driving transistor, wherein the first reset module is configured to transmit, in the first sub-stage, a first initialization signal to the driving transistor in response to a first scanning signal; a gating module electrically connected to the driving transistor, wherein the gating module is configured to perform, in the second sub-stage, a threshold compensation on the driving transistor in response to a second scanning signal; and an input module electrically connected to the driving transistor, wherein the input module is configured to transmit, in the third sub-stage, a data signal to the driving transistor in response to a third scanning signal; wherein X, Y, Z and y are positive integers, y is less than or equal to Y, and Y is greater than Z.

According to embodiments of the present disclosure, the first reset module includes a first reset transistor, the gating module includes a first gating transistor, and the input module includes a first input transistor; the first reset transistor has a first electrode electrically connected to a gate electrode of the driving transistor and a first electrode of the first gating transistor, a gate electrode electrically connected to a first scanning terminal configured to provide the first scanning signal, and a second electrode electrically connected to a first initialization terminal configured to provide the first initialization signal; the first gating transistor has a gate electrode electrically connected to a second scanning terminal configured to provide the second scanning signal, and the first electrode electrically connected to a first electrode of the driving transistor; the first input transistor has a first electrode electrically connected to a second electrode of the driving transistor, a gate electrode electrically connected to a third scanning terminal configured to provide the third scanning signal, and a second electrode electrically connected to a data signal terminal configured to provide the data signal.

According to embodiments of the present disclosure, each of the first reset transistor and the first gating transistor is a first-type transistor, the first input transistor is a second-type transistor, and the first-type transistor is different from the second-type transistor in terms of transistor type.

According to embodiments of the present disclosure, the Y data writing stages do not overlap with each other, and in the $y^{th}$ data writing stage: the first sub-stage does not overlap with the second sub-stage; and the third sub-stage is within the second sub-stage.

According to embodiments of the present disclosure, the Y data writing stages do not overlap with each other, and in the $y^{th}$ data writing stage: the first sub-stage overlaps partially with the second sub-stage; and the third sub-stage is within the second sub-stage, and the third sub-stage does not overlap with the first sub-stage.

According to embodiments of the present disclosure, the third sub-stage in the $y^{th}$ data writing stage is within the second sub-stage in the $y^{th}$ data writing stage; the first sub-stage in the $y^{th}$ data writing stage does not overlap with the second sub-stage in the $y^{th}$ data writing stage; and the first sub-stage in the $y^{th}$ data writing stage overlaps at least partially with the second sub-stage and the third sub-stage in a $(y-1)^{th}$ data writing stage.

According to embodiments of the present disclosure, y is less than Y, and the second sub-stage in the $Y^{th}$ data writing stage does not overlap with the first sub-stage in any of the Y data writing stages.

According to embodiments of the present disclosure, the pixel circuit further includes a light-emission control module, the light-emission control module is electrically connected to a light-emission control terminal, a first voltage terminal, a second electrode of the driving transistor, a first electrode of the driving transistor and the light emitting device, and the light-emission control module is configured to: transmit, in the light emitting stage, a first voltage signal of the first voltage terminal to the second electrode of the driving transistor and conduct the first electrode of the driving transistor to the light emitting device, in response to a light-emission control signal of the light-emission control terminal.

According to embodiments of the present disclosure, the light-emission control module includes a first light-emission control transistor and a second light-emission control transistor; the first light-emission control transistor has a first electrode electrically connected to the second electrode of the driving transistor, a gate electrode electrically connected to the light-emission control terminal, and a second electrode electrically connected to the first voltage terminal; and the second light-emission control transistor has a first electrode electrically connected to a second electrode of the light emitting device, a gate electrode electrically connected to the light-emission control terminal, and a second electrode electrically connected to the first electrode of the driving transistor.

According to embodiments of the present disclosure, the light emitting device has a first electrode electrically connected to a second voltage terminal, the pixel circuit further includes a second reset module, the second reset module is electrically connected to a second initialization terminal, the third scanning terminal and a second electrode of the light emitting device, and the second reset module is configured to: transmit, in the third sub-stage, a second initialization signal of the second initialization terminal to the second electrode of the light emitting device in response to a third scanning signal of the third scanning terminal.

According to embodiments of the present disclosure, the second reset module includes a second reset transistor; the second reset transistor has a first electrode electrically connected to the second electrode of the light emitting device, a gate electrode electrically connected to the third scanning terminal, and a second electrode electrically connected to the second initialization terminal.

According to embodiments of the present disclosure, the $X^{th}$ frame period further includes a plurality of reset stages, and each data writing stage follows at least one reset stage; the pixel circuit further includes a third reset module, the third reset module is electrically connected to a fourth scanning terminal, a third initialization terminal and a second electrode of the driving transistor, and the third reset module is configured to: transmit, in the reset stage, a third initialization signal of the third initialization terminal to the second electrode of the driving transistor in response to a fourth scanning signal of the fourth scanning terminal.

According to embodiments of the present disclosure, the third reset module includes a third reset transistor; the third reset transistor has a first electrode electrically connected to the second electrode of the driving transistor, a gate electrode electrically connected to the fourth scanning terminal, and a second electrode electrically connected to the third initialization terminal.

According to embodiments of the present disclosure, the first reset module includes a first reset transistor, the gating module includes a first gating transistor, and the input module includes a first input transistor; the first reset transistor has a first electrode electrically connected to a gate electrode of the driving transistor and a first electrode of the first gating transistor, a gate electrode electrically connected to the first scanning terminal, and a second electrode electrically connected to the first initialization terminal; the first gating transistor has a gate electrode electrically connected to the second scanning terminal, and a first electrode electrically connected to a first electrode of the driving transistor; the first input transistor has a first electrode electrically connected to a second electrode of the driving transistor, a gate electrode electrically connected to the third scanning terminal, and a second electrode electrically connected to the data signal terminal; each of the first reset transistor and the first gating transistor is a first-type transistor, each of the first input transistor and the third reset transistor is a second-type transistor, and the first-type transistor is different from the second-type transistor in terms of transistor type.

According to embodiments of the present disclosure, none of the first sub-stage, the second sub-stage and the third sub-stage overlaps with the reset stage.

According to embodiments of the present disclosure, the $X^{th}$ frame period further includes a light emitting stage following the $Y^{th}$ data writing stage, and at least one reset stage is provided between the $Y^{th}$ data writing stage and the light emitting stage.

According to embodiments of the present disclosure, at least one reset stage is provided between the second sub-stage in a $(Y-1)^{th}$ data writing stage and the second sub-stage in a $Y^{th}$ data writing stage.

According to embodiments of the present disclosure, Y is greater than or equal to 3.

According to a second aspect of the present disclosure, a method of driving a pixel circuit is provided, the pixel circuit is configured to drive, in an $X^{th}$ frame period, a light emitting device electrically connected to the pixel circuit to emit light; the $X^{th}$ frame period includes Y data writing stages and Z light emitting stages, a $y^{th}$ data writing stage in the Y data writing stages includes a first sub-stage, a second sub-stage and a third sub-stage, the pixel circuit includes a first reset module, a gating module and an input module, and the method includes: in the first sub-stage, providing a first scanning signal, so that the first reset module transmits a first initialization signal to the driving transistor in response to the first scanning signal; in the second sub-stage, providing a second scanning signal, so that the gating module perform a threshold compensation on the driving transistor in response to the second scanning signal; and in the third sub-stage, providing a third scanning signal, so that the input module transmits a data signal to the driving transistor in response to the third scanning signal; wherein X, Y, Z and y are positive integers, y is less than or equal to Y, and Y is greater than Z.

According to a third aspect of the present disclosure, a display panel is provided, including the pixel circuit described above.

According to a fourth aspect of the present disclosure, a display device is provided, and the display device includes the display substrate described above.

BRIEF DESCRIPTION OF THE DRAWINGS

The above contents and other objectives, features and advantages of the present disclosure will be more apparent through the following description of embodiments of the present disclosure with reference to the accompanying drawings.

DETAILED DESCRIPTION OF EMBODIMENTS

Figure 1:
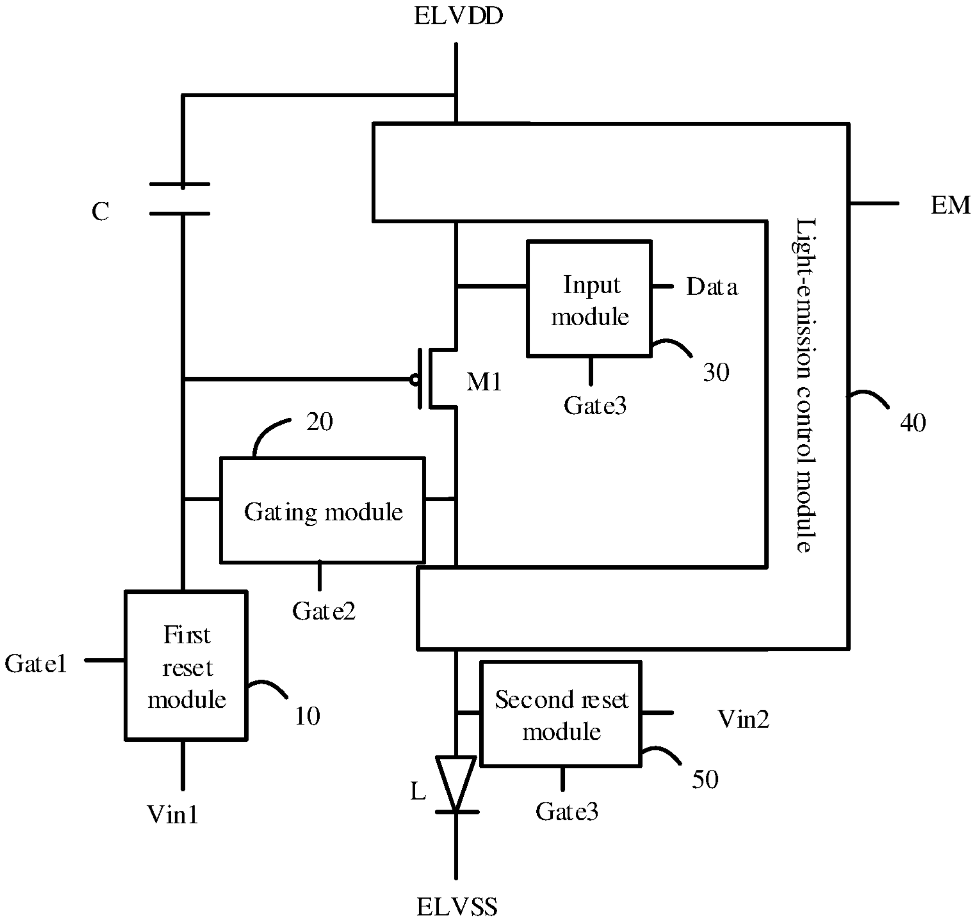
FIG. 1 schematically shows a first functional block diagram of a pixel circuit of embodiments of the present disclosure.

In order to make objectives, technical solutions and advantages of the present disclosure clearer, the technical solutions of embodiments of the present disclosure will be clearly and completely described below with reference to the accompanying drawings. Obviously, the described embodiments are merely some embodiments of the present disclosure, rather than all embodiments. Based on the described embodiments of the present disclosure, all additional embodiments obtained by those ordinary skilled in the art without carrying out inventive effort fall within the scope of protection of the present disclosure.

It should be noted that, in the accompanying drawings, for clarity and/or description purposes, size and relative size of elements may be enlarged. Accordingly, the size and relative size of each element need not to be limited to those shown in the figures. In the specification and the accompanying drawings, the same or similar reference numerals represent the same or similar components.

When an element is described as being "on", "connected to" or "coupled to" another element, the element may be directly on the other element, directly connected to the other element, or directly coupled to the other element, or an intermediate element may be provided. However, when an element is described as being "directly on", "directly connected to" or "directly coupled to" another element, no intermediate element is provided. Other terms and/or expressions used to describe a relationship between elements, such as "between" and "directly between", "adjacent" and "directly adjacent", "on" and "directly on", and so on, should be interpreted in a similar manner. Moreover, the term "connection" may refer to a physical connection, an electrical connection, a communication connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For objectives of the present disclosure, "at least one of X, Y and Z" and "at least one selected from a group consisting of X, Y and Z" may be interpreted as only X, only Y, only Z, or any combination of two or more of X, Y and Z, such as XYZ, XYY, YZ and ZZ. As used herein, the term "and/or" includes any and all combinations of one or more of the listed related items.

It should be noted that although the terms "first", "second", and so on may be used herein to describe various components, members, elements, regions, layers and/or parts, these components, members, elements, regions, layers and/or parts should not be limited by these terms. Rather, these terms are used to distinguish one component, member, element, region, layer and/or part from another. Thus, for example, a first component, a first member, a first element, a first region, a first layer and/or a first part discussed below may be referred to as a second component, a second member, a second element, a second region, a second layer and/or a second part without departing from teachings of the present disclosure.

For ease of description, spatial relationship terms, such as "upper", "lower", "left", "right", may be used herein to describe a relationship between one element or feature and another element or feature as shown in the figures. It should be understood that the spatial relationship terms are intended to cover other different orientations of a device in use or operation in addition to the orientation described in the figures. For example, if a device in the figures is turned upside down, an element or feature described as "below" or "under" another element or feature will be oriented "above" or "on" the other element or feature.

Those skilled in the art should understand that herein, unless otherwise specified, the expression "thickness" refers to a size in a direction perpendicular to a surface of the display panel provided with various film layers, that is, a size in a light exit direction of the display substrate.

Here, unless otherwise specified, the expression "patterning process" generally includes steps of photoresist coating, exposure, development, etching, and photoresist stripping. The expression "one-time patterning process" means a process of forming patterned layers, components, elements and so on by using one mask.

It should be noted that the expressions "the same layer", "arranged in the same layer" or similar expressions refer to a layer structure that is formed by firstly forming, using a same film forming process, a film layer used to form a specific pattern, and then patterning, using one-time patterning process, the film layer with a same mask. Depending on the specific patterns, the one-time patterning process may include plurality of exposure, development or etching processes, and the specific pattern in the formed layer structure may be continuous or discontinuous. These specific patterns may be at different heights or have different thicknesses.

Here, unless otherwise specified, the expression "electrically connected" may mean that two components or elements are directly electrically connected to each other. For example, component or element A is in direct contact with component or element B, and an electrical signal may be transmitted between the two components or elements. It may also mean that two components or elements are electrically connected through a conductive medium such as a conductive wire. For example, component or element A is electrically connected to component or element B through a conductive wire so that an electrical signal is transmitted between the two components or elements. Alternatively, it may also mean that two components or elements are electrically connected through at least one electronic component. For example, component or element A is electrically connected to component or element B through at least one thin film transistor so that an electrical signal is transmitted between the two components or elements.

In an example, an OLED display panel is provided, which includes a light emitting device and a pixel circuit used to provide a driving signal to the light emitting device. The pixel circuit includes a driving transistor that may generate a driving signal according to a gate-source voltage. In this example, the pixel circuit is configured to drive, in a frame period, the light emitting device electrically connected to the pixel circuit to emit light. The frame period includes a data writing stage and a light emitting stage. In the data writing stage, various electrical signals, such as an initialization signal, a data signal and a threshold voltage of the driving transistor, may be provided to a gate electrode of the driving transistor, so that an electrical signal related to the data signals may be finally written to the gate electrode of the driving transistor. In the light emitting stage, a constant electrical signal may be provided to a source electrode of the driving transistor. At this time, the driving transistor may output a driving current related to the data signal according to the gate-source voltage, so as to drive the light emitting device to emit light.

In this example, the display panel further includes a variety of sensors, such as an infrared sensor and a light sensor, arranged on a backlight side of a layer where the pixel circuit is located. It is needed to avoid blocking these sensors as far as possible, so as to ensure an effective operation. At present, in order to obtain a higher screen-to-body ratio, it is possible to provide a transparent hole in a display region of the display panel and place the above-mentioned sensors in the transparent hole. Few or even no electronic component that may block light, such as pixel circuit, is provided in the transparent hole. In this way, it is possible to prevent the sensors from being shielded, and the display region may be as large as possible, so that the screen-to-body ratio may be improved. However, such design may lead to a Hole Mura around the transparent hole, which may affect a display effect. The Hole Mura refers to a phenomenon of various traces caused by a non-uniform display brightness.

In researches, the inventors found that one reason for a formation of the Hole Mura is that since few or even no electronic component is not provided at the transparent hole, so that a wire near the transparent hole has a smaller load as compared to the wires at other places. The wire may include, for example, an initialization signal wire that transmits an initialization signal. Accordingly, in a pixel circuit electrically connected to the wire with a small load, an electrical signal finally written to the gate electrode of the driving transistor fails to reach a desired value. For example, due to a small load on the wire used to provide the initialization signal, a potential of the initialization signal written to the gate electrode of the driving transistor may be offset in a positive direction, which may affect a final potential of the gate electrode of the driving transistor, then affect a driving current output by the driving transistor, and finally darken the light emitting device and result in Hole Mura.

Figure 2:
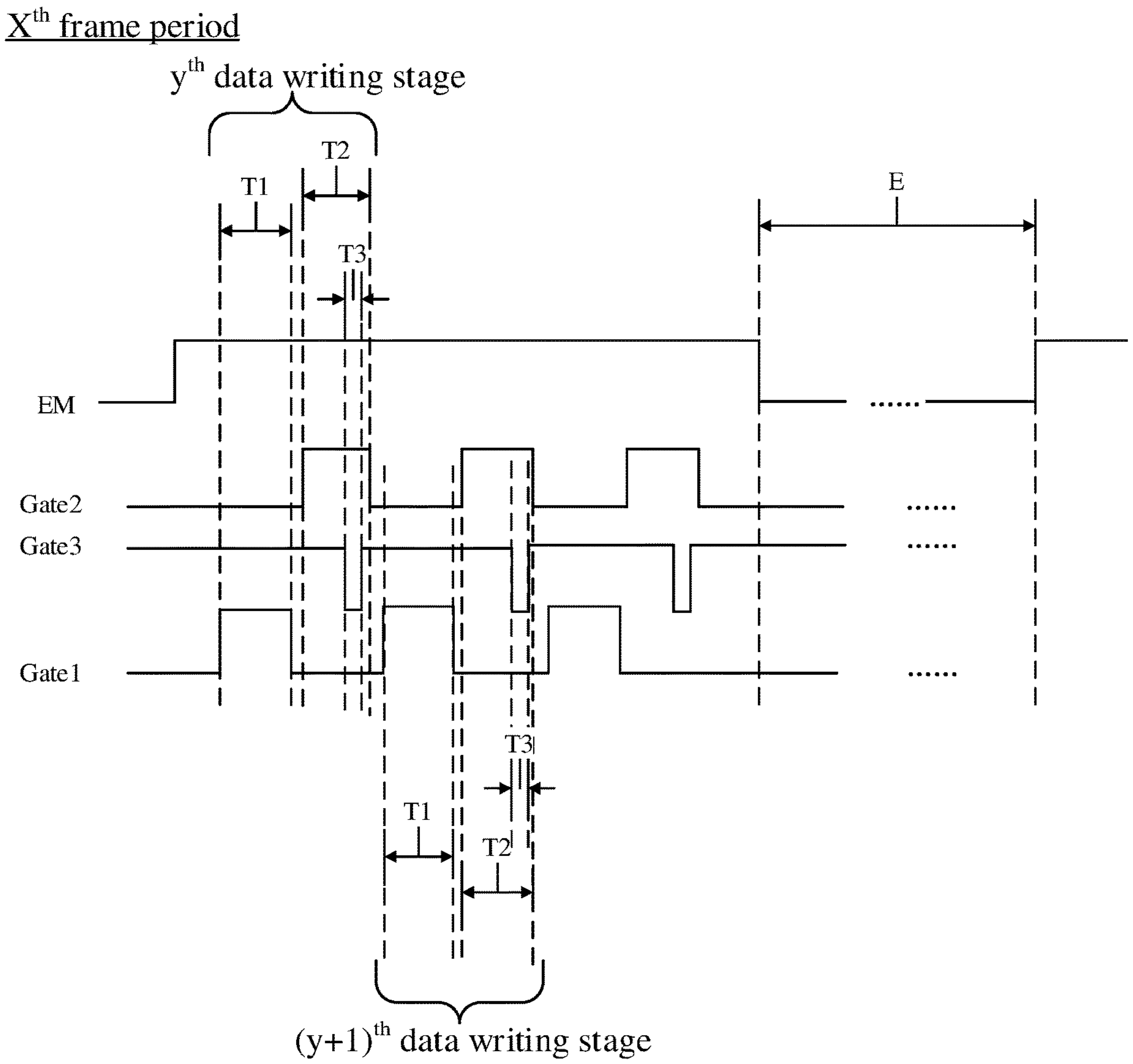
FIG. 2 schematically shows a first driving timing diagram of a pixel circuit in embodiments of the present disclosure.

In view of this, embodiments of the present disclosure provide a pixel circuit. FIG. 1 schematically shows a first functional block diagram of a pixel circuit of embodiments of the present disclosure. FIG. 2 schematically shows a first driving timing diagram of the pixel circuit in embodiments of the present disclosure. With reference to FIG. 1 and FIG. 2, the pixel circuit is used to drive, in an $X^{th}$ frame period, a light emitting device electrically connected to the pixel circuit to emit light. The $X^{th}$ frame period includes Y data writing stages T and Z light emitting stages E. A $y^{th}$ data writing stage of the Y data writing stages T includes a first sub-stage T1, a second sub-stage T2, and a third sub-stage T3. The pixel circuit provided by embodiments of the present disclosure includes a driving transistor M1, a first reset module 10, a gating module 20, and an input module 30. X, Y, Z and y are all positive integers, y is less than or equal to Y, and Y is greater than Z. For example, Z=1, Y≥2.

In embodiments of the present disclosure, a frame period for the pixel circuit may include a plurality of data writing stages T and one or more light emitting stages E following the last data writing stage T. In other words, in a frame period, a plurality of data writing stages T may be repeated before the light emitting stage E. In at least one data writing stage T, operations such as reset, threshold compensation and target data writing may be performed in the first sub-stage T1, the second sub-stage T2 and the third sub-stage T3. Therefore, when a plurality of data writing stages T are provided in a frame period, the first sub-stage T1, the second sub-stage T2 and the third sub-stage T3 may be repeated for multiple times in the plurality of data writing stages T, that is, the reset, threshold compensation and target data writing operations may be performed for multiple times. The target data may refer to a data signal provided by a data signal terminal Data.

Optionally, the first sub-stage T1, the second sub-stage T2 and the third sub-stage T3 may not overlap with each other. Alternatively, at least two of the first sub-stage T1, the second sub-stage T2 and the third sub-stage T3 overlap with each other, for example, the third sub-stage T3 is within the second sub-stage T2. For another example, a third scanning signal of a third scanning terminal Gate3 may be synchronized with a second scanning signal of a second scanning terminal Gate2.

In the light emitting stage E, the driving transistor M1 and the light emitting device L may be conducted, so as to drive the light emitting device L to emit light.

Specifically, the driving transistor M1 is electrically connected to the light emitting device L. The first reset module 10 is electrically connected to the driving transistor M1. The first reset module 10 is used to transmit, in the first sub-stage T1, a first initialization signal to a gate electrode of the driving transistor M1 in response to a first scanning signal. For example, a first electrode of the driving transistor M1 is electrically connected to the light emitting device L. The first reset module 10 is electrically connected to a gate electrode of the driving transistor M1, a first scanning terminal Gate1 and a first initialization terminal Vin1. The first reset module 10 is specifically used to transmit the first initialization signal of the first initialization terminal Vin1 to the gate electrode of the driving transistor M1 in response to the first scanning signal of the first scanning terminal Gate1.

The gating module 20 is electrically connected to the driving transistor M1. The gating module 20 is used to perform, in the second sub-stage T2, a threshold compensation on the driving transistor M1 in response to a second scanning signal. For example, the gating module 20 is electrically connected to the second scanning terminal Gate2, the first electrode of the driving transistor M1, and the gate electrode of the driving transistor M1. The gating module 20 is specifically used to conduct the gate electrode of the driving transistor M1 and the first electrode of the driving transistor M1 in response to the second scanning signal of the second scanning terminal Gate2, so as to perform a threshold compensation on the driving transistor M1.

The input module 30 is electrically connected to the driving transistor M1. The input module 30 is used to transmit, in the third sub-stage T3, a data signal to the driving transistor M1 in response to the third scanning signal. For example, the input module 30 is electrically connected to a second electrode of the driving transistor M1, the third scanning terminal Gate3 and the data signal terminal Data. The input module 30 is specifically used to transmit the data signal of the data signal terminal Data to the second electrode of the driving transistor M1 in response to the third scanning signal of the third scanning terminal Gate3.

In embodiments of the present disclosure, the light emitting device L is an OLED device. In the light emitting stage E, the driving transistor M1 may provide a driving current to the light emitting device L in response to a pressure difference between the gate electrode and the second electrode of the driving transistor M1, so as to drive the light emitting device L to emit light.

In embodiments of the present disclosure, in the first sub-stage T1, the gate electrode of the driving transistor M1 may be reset, so that the gate electrode of the driving transistor M1 has a same initial potential in the plurality of frame periods, which may help to improve a display uniformity.

In embodiments of the present disclosure, in the second sub-stage T2, by conducting the gate electrode and the first electrode of the driving transistor M1, a threshold voltage Vth of the driving transistor M1 may be obtained and transmitted to the gate electrode of the driving transistor M1. For example, the threshold voltage Vth may be written to a storage capacitor C connected between the gate electrode of the driving transistor M1 and a constant voltage terminal. Then, in the light emitting stage E, it is possible to eliminate an influence of the threshold voltage Vth on a current output by the driving transistor M1.

In embodiments of the present disclosure, in the third sub-stage T3, the data signal of the data signal terminal Data is transmitted to the second electrode of the driving transistor M1, and then the data signal may be transmitted to the gate electrode of the driving transistor M1 through the driving transistor M1 and the gating module 20. Since the driving transistor M1 outputs the driving current according to a voltage at the gate electrode and a voltage at the first electrode, a size of the driving current output by the driving transistor M1 is related to the data signal. Accordingly, when the light emitting device L emits light in response to the driving current, the brightness is related to the data signal. Then the brightness of the light emitting device L may be controlled by the data signal.

In embodiments of the present disclosure, as described above, for a pixel circuit, a frame period includes a plurality of data writing stages T, and each data writing stage T may include the first sub-stage T1, the second sub-stage T2 and the third sub-stage T3 for performing the reset, threshold compensation and target data writing operations. In this way, an influence of the load on the wire to the electrical signal finally written to the gate electrode of the driving transistor M1 may be significantly reduced. For example, in a frame period, the potential of the first initialization signal finally written to the gate electrode of the driving transistor M1 may be offset in a negative direction by resetting the potential of the gate electrode of the driving transistor M1 for several times, so as to compensate the positive offset of the potential of the first initialization signal due to the small load on the wire. Then an electrical signal finally written to the gate electrode of the driving transistor M1 may approach or even reach a target value, so that the Hole Mura may be significantly improved to be invisible to naked eyes.

The pixel circuit of embodiments of the present disclosure will be further described with reference to FIG. 1 to FIG. 6*c*.

In some specific embodiments, the pixel circuit may adopt a 7T1C structure, or an 8T1C structure, and so on, which may be determined according to actual needs and is not limited here.

Figure 3:
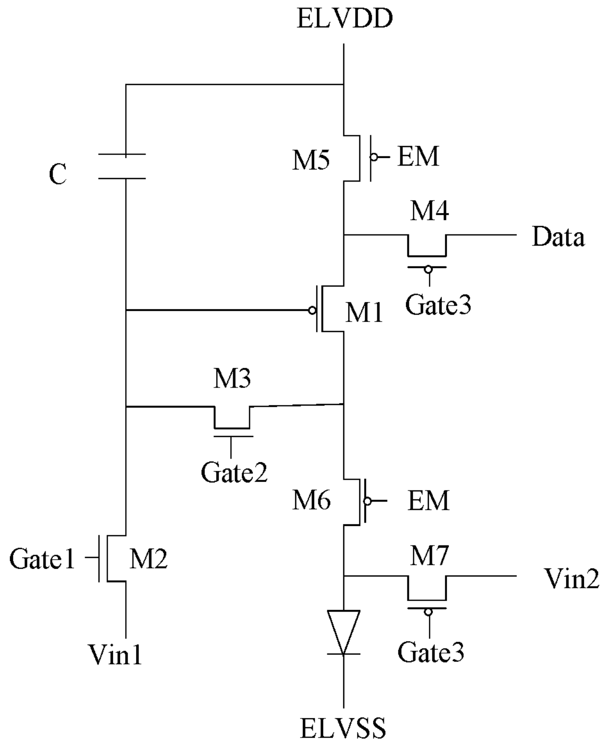
FIG. 3 schematically shows an equivalent circuit diagram of a pixel circuit using a 7T1C structure of embodiments of the present disclosure.

FIG. 3 schematically shows an equivalent circuit diagram of a pixel circuit using a 7T1C structure of embodiments of the present disclosure. As shown in FIG. 3, the 7T1C structure is illustrated by way of example to further describe the pixel circuit in embodiments of the present disclosure.

In some specific embodiments, the first reset module 10 includes a first reset transistor M2, the gating module 20 includes a first gating transistor M3, and the input module 30 includes a first input transistor M4.

The first reset transistor M2 has a first electrode electrically connected to the gate electrode of the driving transistor M1 and a first electrode of the first gating transistor M3, a gate electrode electrically connected to the first scanning terminal Gate1 used to provide the first scanning signal, and a second electrode electrically connected to the first initialization terminal Vin1 used to provide the first initialization signal.

The first gating transistor M3 has a gate electrode electrically connected to the second scanning terminal Gate2 used to provide the second scanning signal, and a first electrode electrically connected to the first electrode of the driving transistor M1.

The first input transistor M4 has a first electrode electrically connected to the second electrode of the driving transistor M1, a gate electrode electrically connected to the third scanning terminal Gate3 used to provide the third scanning signal, and a second electrode electrically connected to the data signal terminal Data.

In some specific embodiments, each of the first reset transistor M2 and the first gating transistor M3 is a first-type transistor, and the first input transistor M4 is a second-type transistor. The first-type transistor is different from the second-type transistor in terms of transistor type.

In embodiments of the present disclosure, the pixel circuit may be implemented using an LTPO technology. For example, the first-type transistor may include an N-type transistor implemented by an IGZO process, and the second-type transistor may include a P-type transistor implemented by an LTPS process.

It should be noted that in embodiments of the present disclosure, a transistor may be divided into a source electrode, a drain electrode and a gate electrode according to electrical performance. It should be noted that in embodiments of the present disclosure, the first electrode and the second electrode of the transistor are merely used to distinguish two different electrodes of the transistor, rather than actually indicate a specific electrode of the transistor. In other words, the first electrode of the transistor does not specifically refer to the source electrode or the drain electrode, and the second electrode of the transistor does not specifically refer to the source electrode or the drain electrode. The source electrode and the drain electrode of the transistor may be specifically determined from the first electrode and the second electrode according to an actual connection mode of the transistor in the pixel circuit, which is not limited here.

In some specific embodiments, the pixel circuit further includes a storage capacitor C connected between the gate electrode of the driving transistor M1 and the first voltage terminal ELVDD, and a light-emission control module and a second reset module that will be described below, which will not be explained in detail here.

In embodiments of the present disclosure, the first scanning signal, the second scanning signal and the third scanning signal refer to "active level signals". The "active level signal" refers to a signal that may control a turn-on of the transistor after being input to a control electrode of the transistor (that is, the gate electrode of the transistor). Accordingly, an "inactive level signal" refers to a signal that may control a turn-off of the transistor after being input to the control electrode of the transistor. For an N-type transistor, a high-level signal is the active level signal, and a low-level signal is the inactive level signal. For a P-type transistor, a low-level signal is the active level signal, and a high-level signal is the inactive level signal.

Three solutions for the data writing stage T in a case of the 7T1C structure of the pixel circuit in embodiments of the present disclosure will be described below with reference to FIG. 2 to FIG. 4*b*.

As shown in FIG. 2, in some specific embodiments, the $X^{th}$ frame period includes Y data writing stages T, and each of the Y data writing stages T includes the first sub-stage T1, the second sub-stage T2, and the third sub-stage T3. The Y data writing stages T do not overlap with each other. In the $y^{th}$ data writing stage T, the first sub-stage T1 does not overlap with the second sub-stage T2, and the third sub-stage T3 is within the second sub-stage T2.

In embodiments of the present disclosure, in the first sub-stage T1, the first scanning signal is provided to the first scanning terminal Gate1. At this time, the first reset transistor M2 is turned on, and the first initialization signal of the first initialization terminal Vin1 is transmitted to the gate electrode of the driving transistor M1 and written to the storage capacitor C.

When the first sub-stage T1 reaches a predetermined duration, the inactive level signal is provided to the first scanning terminal Gate1. At this time, the first reset transistor M2 is turned off, and the first sub-stage T1 ends. After that, the second scanning signal is provided to the second scanning terminal Gate2, and the second sub-stage T2 starts. At this time, the first gating transistor M3 is turned on, the gate electrode and the first electrode of the driving transistor M1 are conducted, and the threshold voltage of the driving transistor M1 is written to the storage capacitor C.

Before the end of the second sub-stage T2, the third scanning signal is provided to the third scanning terminal Gate3, that is, the third sub-stage T3 starts. At this time, the first input transistor M4 is turned on. The data signal provided by the data signal terminal Data is transmitted to the gate electrode of the driving transistor M1 through the first input transistor M4, the driving transistor M1 and the first gating transistor M3, and is written to the storage capacitor C.

When the third sub-stage T3 reaches a predetermined duration, the inactive level signal is provided to the third scanning terminal Gate3. At this time, the first input transistor M4 is turned off, and the third sub-stage T3 ends.

Optionally, the third sub-stage T3 may be ended before the end of the second sub-stage T2; or the second sub-stage T2 and the third sub-stage T3 may be ended at the same time. Preferably, in embodiments of the present disclosure, the third sub-stage is ended before the end of the second sub-stage T2, so that a good light-emission uniformity may be achieved.

In some specific embodiments, the duration of the first sub-stage T1 is substantially the same as that of the second sub-stage T2.

In some specific embodiments, a ratio of the duration of the second sub-stage T2 to the duration of the third sub-stage T3 may be set to 9 to 15, including boundary values. For example, the ratio of the duration of the second sub-stage T2 to the duration of the third sub-stage T3 may be set to 12.

In some specific embodiments, the third sub-stage T3 may start when the second sub-stage T2 reaches a target duration. The target duration may be ⅕ to ⅓ of the duration of the second sub-stage T2, including the boundary value. For example, the target duration may be ¼ of the duration of the second sub-stage T2.

When the second sub-stage T2 reaches the predetermined duration, the inactive level signal is provided to the second scanning terminal Gate2. At this time, the first gating transistor M3 is turned off, and the second sub-stage T2 ends.

The above is a complete data writing stage T in this example. In this example, the above-mentioned data writing stage T may be performed for multiple times in a frame period. For example, in some specific embodiments, Y is greater than or equal to 3, for example, Y=3, that is, in a frame period, the data writing stage T is performed for three times, so that the Hole Mura may be improved better.

In some specific embodiments, in the $X^{th}$ frame period, the second sub-stage T2 may overlap with the third sub-stage T3 for multiple times, for example, a number of overlapping times is greater than or equal to Z. For example, in the $X^{th}$ frame period, Y=3, Z=1, that is, the $X^{th}$ frame period includes three data writing stages T and one light emitting stage E. In this case, in a first data writing stage T, the third sub-stage T3 may be within the second sub-stage T2, and in the second data writing stage T and/or the third data writing stage T, the third sub-stage T3 may be within the second sub-stage T2.

Optionally, in the $X^{th}$ frame period, the number of overlapping times of the second sub-stage T2 and the third sub-stage T3 may be equal to Y. For example, the third sub-stage T3 is within the second sub-stage T2 in each data writing stage T.

In a frame period, after the completion of the last data writing stage T, the process may enter the Z light emitting stages E, so that the driving transistor M1 generates a driving current according to the voltage at the gate electrode and the voltage at the second electrode, so as to drive the light emitting device L to emit light. Optionally, Z≥1, for example, Z=2, that is, the light emitting stage E may be performed twice in one frame period.

Figure 4A:
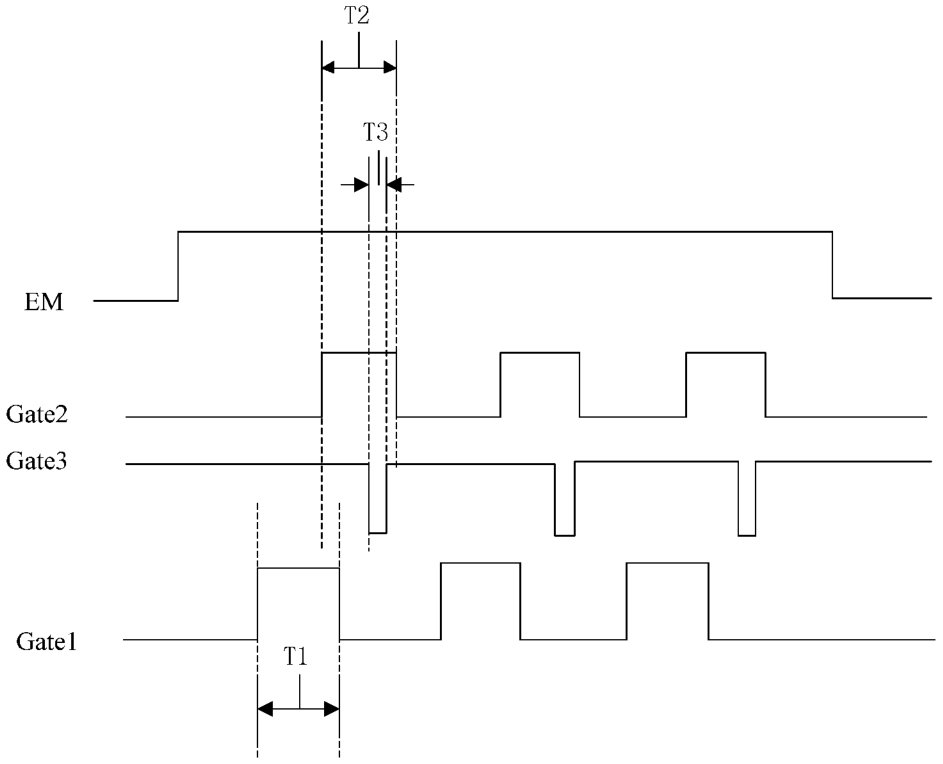
FIG. 4*a* schematically shows a second driving timing diagram of the pixel circuit in embodiments of the present disclosure.

FIG. 4*a* schematically shows a second driving timing diagram of the pixel circuit in embodiments of the present disclosure. As shown in FIG. 4*a*, in some specific embodiments, the Y data writing stages T do not overlap with each other; in the $y^{th}$ data writing stage T, the first sub-stage T1 overlaps partially with the second sub-stage T2, the third sub-stage T3 is within the second sub-stage T2, and the third sub-stage T3 does not overlap with the first sub-stage T1.

In embodiments of the present disclosure, in the first sub-stage T1, the first scanning signal is provided to the first scanning terminal Gate1. At this time, the first reset transistor M2 is turned on, and the first initialization signal of the first initialization terminal Vin1 is transmitted to the gate electrode of the driving transistor M1 and written to the storage capacitor C.

Before the end of the first sub-stage T1, the second scanning signal is provided to the second scanning terminal Gate2, and the second sub-stage T2 starts. At this time, the first gating transistor M3 is turned on, the gate electrode and the first electrode of the driving transistor M1 are conducted, and the threshold voltage of the driving transistor M1 is written to the storage capacitor C. When the first sub-stage T1 reaches a predetermined duration, the inactive level signal is provided to the first scanning terminal Gate1. At this time, the first reset transistor M2 is turned off, and the first sub-stage T1 ends.

After the end of the first sub-stage T1 and before the end of the second sub-stage T2, the third scanning signal is provided to the third scanning terminal Gate3, that is, the third sub-stage T3 starts. At this time, the first input transistor M4 is turned on, and the data signal is transmitted to the gate electrode of the driving transistor M1 through the first input transistor M4, the driving transistor M1 and the first gating transistor M3, and is written to the storage capacitor C.

After the third sub-stage T3 reaches the predetermined duration, the inactive level signal is provided to the third scanning terminal Gate3. At this time, the first input transistor M4 is turned off, and the third sub-stage T3 ends.

In some specific embodiments, a difference between a start time of the first sub-stage T1 and a start time of the second sub-stage T2 is greater than a difference between the start time of the second sub-stage T1 and a start time of the third sub-stage T3. Therefore, the start time of the third sub-stage T3 may be closer to the start time of the second sub-stage T2, which may help to improve the light-emission uniformity.

After the second sub-stage T2 reaches the predetermined duration, the inactive level signal is provided to the second scanning terminal Gate2. At this time, the first gating transistor M3 is turned off, and the second sub-stage T2 ends.

The above is a complete data writing stage T in this example. After the completion of the last data writing stage T, the light emitting stage E may start.

In some specific embodiments, in the $X^{th}$ frame period, the first sub-stage T1 overlaps with the second sub-stage T2 for multiple times, for example, the number of overlapping times is greater than or equal to Z. For example, in the $X^{th}$, frame period, Y=3, Z=1, that is, the $X^{th}$ frame period includes three data writing stages T and one light emitting stage E. In this case, in the first data writing stage T, the first sub-stage T1 may overlap partially with the second sub-stage T2, and in the second data writing stage T and/or the third data writing stage T, the first sub-stage T1 may overlap partially with the second sub-stage T2.

It should be noted that detailed descriptions of such embodiments may refer to the aforementioned embodiments, such as "in the $X^{th}$ frame period, the second sub-stage T2 overlaps with the third sub-stage T3 for multiple times", and "the third sub-stage T3 is ended before the end of the second sub-stage T2; or the second sub-stage T2 and the third sub-stage T3 are ended at the same time", which will not be repeated here.

Figure 4B:
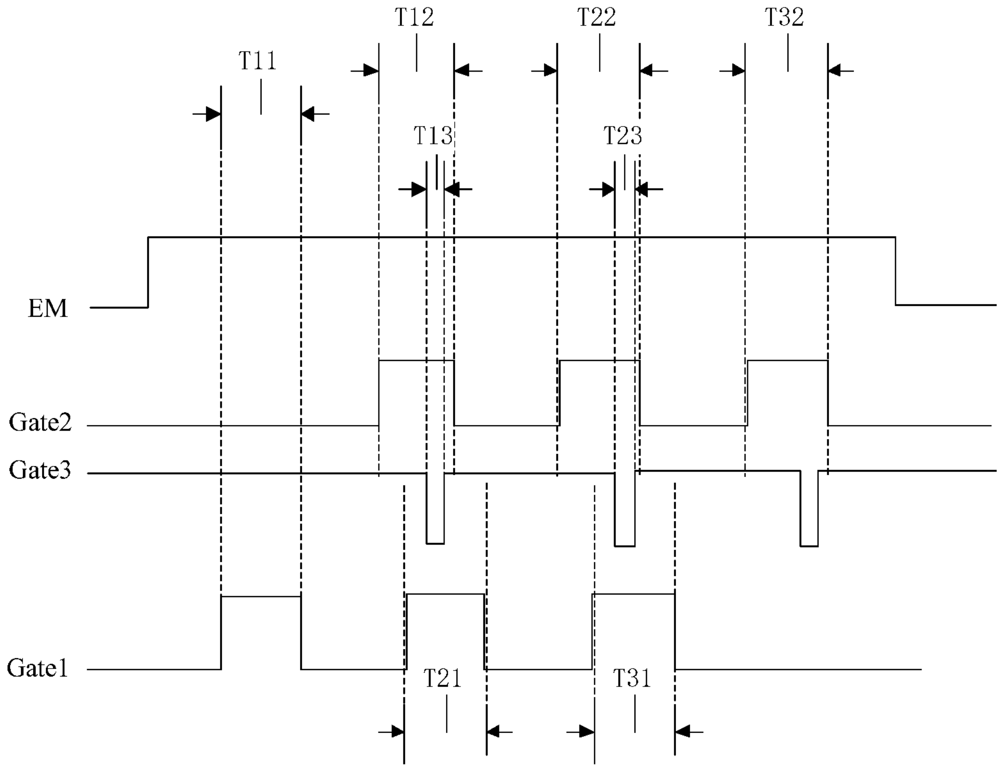
FIG. 4*b* schematically shows a third driving timing diagram of the pixel circuit in embodiments of the present disclosure.

FIG. 4*b* schematically shows a third driving timing diagram of the pixel circuit in embodiments of the present disclosure. As shown in FIG. 4*b*, in some specific embodiments, a third sub-stage T23 in the $y^{th}$ data writing stage T is within a second sub-stage T22 in the $y^{th}$ data writing stage T. The first sub-stage T21 in the $y^{th}$ data writing stage T does not overlap with the second sub-stage T22 in the $y^{th}$ data writing stage T. The first sub-stage T21 in the $y^{th}$ data writing stage T overlaps at least partially with a second sub-stage T12 and a third sub-stage T13 in a $(y-1)^{th}$ data writing stage T.

In embodiments of the present disclosure, in a first sub-stage T11 of the $(y-1)^{th}$ data writing stage T, the first scanning signal is provided to the first scanning terminal Gate1. At this time, the first reset transistor M2 is turned on, and the first initialization signal of the first initialization terminal Vin1 is transmitted to the gate electrode of the driving transistor M1 and written to the storage capacitor C.

After the first sub-stage T11 reaches the predetermined duration, the inactive level signal is provided to the first scanning terminal Gate1. At this time, the first reset transistor M2 is turned off, and the first sub-stage T11 in the $(y-1)^{th}$ data writing stage T ends.

Then, the second scanning signal is provided to the second scanning terminal Gate2, and the second sub-stage T12 in the $(y-1)^{th}$ data writing stage T starts. At this time, the first gating transistor M3 is turned on, the gate electrode and the first electrode of the driving transistor M1 are conducted, and the threshold voltage of the driving transistor M1 is written to the storage capacitor C.

Before the end of the second sub-stage T12 in the $(y-1)^{th}$ data writing stage T, the first scanning signal is provided to the first scanning terminal Gate1, and the first sub-stage T21 in the $y^{th}$ data writing stage T starts. At this time, the first reset transistor M2 is turned on, and the first initialization signal of the first initialization terminal Vin1 is transmitted to the gate electrode of the driving transistor M1 and written to the storage capacitor C.

Before the end of the second sub-stage T12 in the $(y-1)^{th}$ data writing stage T, the third scanning signal is provided to the third scanning terminal Gate3, that is, the third sub-stage T13 in the $(y-1)^{th}$ data writing stage T starts. At this time, the first input transistor M4 is turned on, and the data signal is transmitted to the gate electrode of the driving transistor M1 through the first input transistor M4, the driving transistor M1 and the first gating transistor M3, and is written to the storage capacitor C.

After the third sub-stage T13 in the $(y-1)^{th}$ data writing stage T reaches the predetermined duration, the inactive level signal is provided to the third scanning terminal Gate3. At this time, the first input transistor M4 is turned off, and the third sub-stage T13 in the $(y-1)^{th}$ data writing stage T ends.

Before the end of the first sub-stage T21 in the $y^{th}$ data writing stage T, the inactive level signal is provided to the second scanning terminal Gate2. At this time, the first gating transistor M3 is turned off, and the second sub-stage T12 in the $(y-1)^{th}$ data writing stage T ends.

In some specific embodiments, in the $X^{th}$ frame period, the first sub-stage T1 overlaps with the second sub-stage T2 for multiple times, for example, the number of overlapping times is greater than or equal to Z and less than Y. For example, in the $X^{th}$ frame period, Y=3, Z=1, that is, the $X^{th}$ frame period includes three data writing stages T and one light emitting stage E. Assuming y=2, then the first sub-stage T11 in the first data writing stage T may not overlap with any of the second sub-stages (T12, T22 and T32) and the third sub-stages (T13, T23 and T33), the second sub-stage T12 in the first data writing stage T may overlap partially with the first sub-stage T21 in the second data writing stage T, and the second sub-stage T22 in the second data writing stage T may overlap partially with the first sub-stage T31 in the third data writing stage T.

It should be noted that detailed descriptions in such embodiments may refer to the aforementioned embodiments, such as "in the $X^{th}$ frame period, the second sub-stage T2 overlaps with the third sub-stage T3 for multiple times", and "the third sub-stage T3 is ended before the end of the second sub-stage T2; or the second sub-stage T2 and the third sub-stage T3 are ended at the same time", which will not be repeated here.

In some specific embodiments, y is less than Y. The second sub-stage T32 in the $Y^{th}$ data writing stage T (that is, the last data writing stage T in a frame period) does not overlap with the first sub-stage (T11, T21 or T31) in any of the Y data writing stages T.

Optionally, the third sub-stage T33 in the $Y^{th}$ data writing stage may be within the second sub-stage T32. Accordingly, the third sub-stage T33 in the $Y^{th}$ data writing stage does not overlap with the first sub-stage (T11, T21 or T31) in any of the Y data writing stages T.

In this way, the data signal finally written in the last data writing stage T may be prevented from being interfered by the initialization signal. After the completion of the last data writing stage T, the light emitting stage E may start.

As shown in FIG. 1 and FIG. 2, in some specific embodiments, the $X^{th}$ frame period further includes a light emitting stage E following the $Y^{th}$ data writing stage T. The pixel circuit further includes a light-emission control module 40, which is electrically connected to a light-emission control terminal EM, the first voltage terminal ELVDD, the second electrode of the driving transistor M1, the first electrode of the driving transistor M1 and the light emitting device L. The light-emission control module 40 is used to: transmit, in the light emitting stage E, a first voltage signal of the first voltage terminal ELVDD to the second electrode of the driving transistor M1 and conduct the first electrode of the driving transistor M1 and the light emitting device L in response to a light-emission control signal of the light-emission control terminal EM, so that the driving current of the driving transistor M1 may be transmitted to the light emitting device L to drive the light emitting device L to emit light.

As shown in FIG. 1 to FIG. 3, in some specific embodiments, the light-emission control module 40 includes a first light-emission control transistor M5 and a second light-emission control transistor M6.

The first light-emission control transistor M5 has a first electrode electrically connected to the second electrode of the driving transistor M1, a gate electrode electrically connected to the light-emission control terminal EM, and a second electrode electrically connected to the first voltage terminal ELVDD.

The second light-emission control transistor M6 has a first electrode electrically connected to a second electrode of the light emitting device L, a gate electrode electrically connected to the light-emission control terminal EM, and a second electrode electrically connected to the first electrode of the driving transistor M1.

In the light emitting stage E, a light-emission control signal is provided to the light-emission control terminal EM. At this time, the first light-emission control transistor M5 and the second light-emission control transistor M6 are turned on. The first voltage signal of the first voltage terminal ELVDD is transmitted to the second electrode of the driving transistor M1, and the driving current generated by the driving transistor M1 may be transmitted to the light emitting device L.

In some specific embodiments, a first electrode of the light emitting device L is electrically connected to a second voltage terminal ELVSS. The pixel circuit further includes a second reset module 50, which is electrically connected to a second initialization terminal Vin2, the third scanning terminal Gate3, and the second electrode of the light emitting device L. The second reset module 50 is used to transmit, in the third sub-phase T3, a second initialization signal of the second initialization terminal Vin2 to the second electrode of the light emitting device L in response to the third scanning signal of the third scanning terminal Gate3, so as to reset the second electrode of the light emitting device L.

In some specific embodiments, the second reset module 50 includes a second reset transistor M7. The second reset transistor M7 has a first electrode electrically connected to the second electrode of the light emitting device L, a gate electrode electrically connected to the third scanning terminal Gate3, and a second electrode electrically connected to the second initialization terminal Vin2.

Figure 5A:
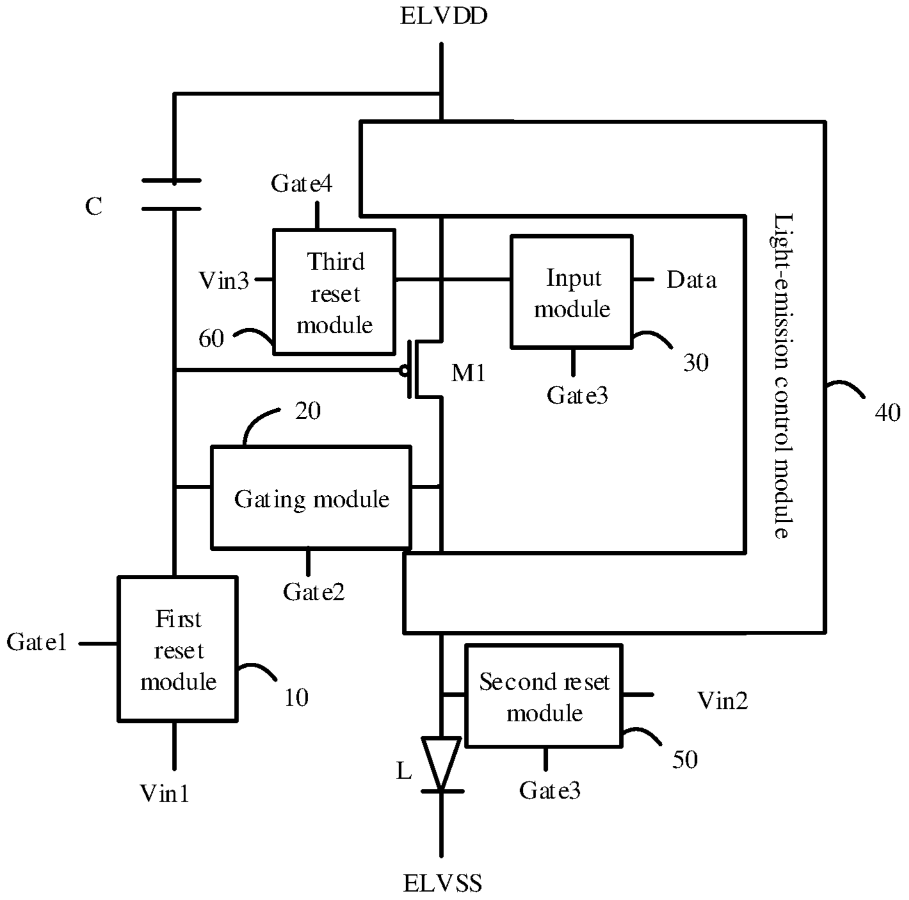
FIG. 5*a* schematically shows a second functional block diagram of the pixel circuit of embodiments of the present disclosure.
Figure 5B:
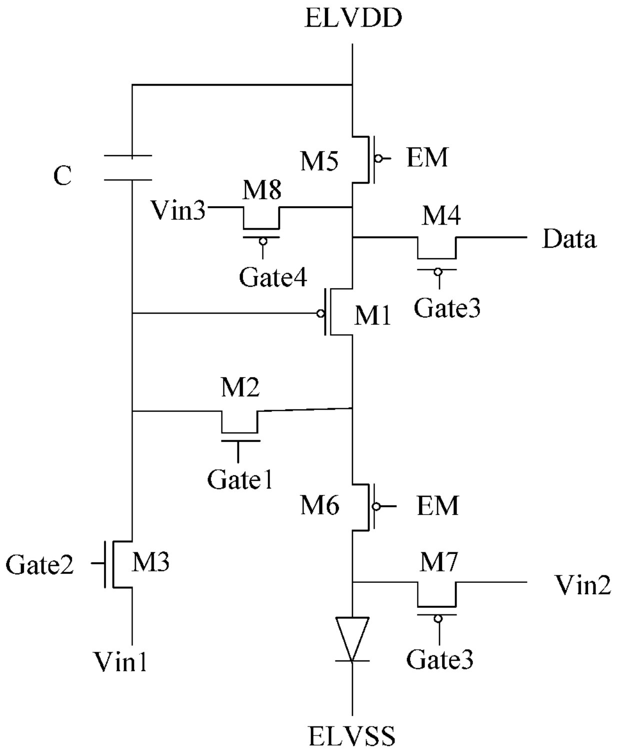
FIG. 5*b* schematically shows an equivalent circuit diagram of a pixel circuit using an 8T1C structure of embodiments of the present disclosure.

In some specific embodiments, the pixel circuit may also adopt an 8T1C structure. FIG. 5*a* schematically shows a second functional block diagram of the pixel circuit of embodiments of the present disclosure. FIG. 5*b* schematically shows an equivalent circuit diagram of a pixel circuit using an 8T1C structure of embodiments of the present disclosure. With reference to FIG. 5*a* and FIG. 5*b*, different from the 7T1C structure, a third reset module 60 is added to the 8T1C structure.

Figure 6A:
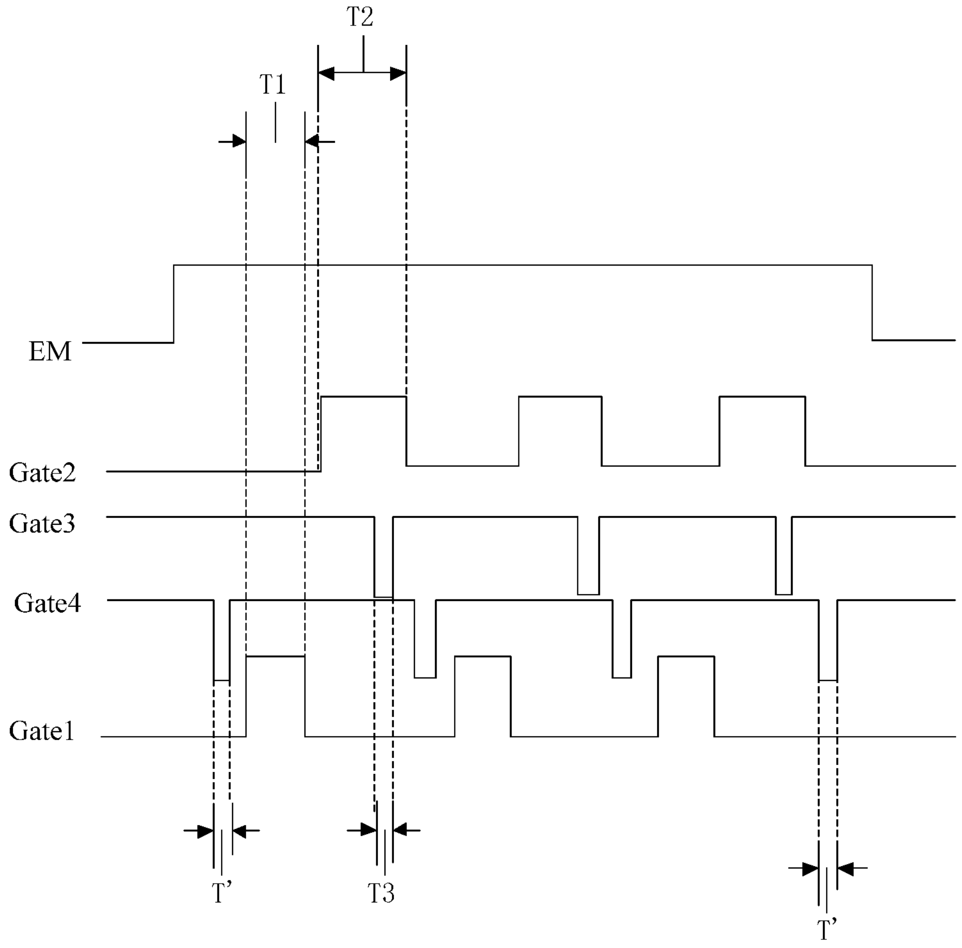
FIG. 6*a* schematically shows a fourth driving timing diagram of the pixel circuit in embodiments of the present disclosure.

FIG. 6*a* schematically shows a fourth driving timing diagram of the pixel circuit in embodiments of the present disclosure. As shown in FIG. 6*a*, in some specific embodiments, the $X^{th}$ frame period further includes a plurality of reset stages T', and each data writing stage T follows at least one reset stage T'. The so called "before the data writing stage T" may refer to before entering the first sub-stage T1 in the data writing stage T. The pixel circuit further includes a third reset module 60, which is electrically connected to a fourth scanning terminal Gate4, a third initialization terminal Vin3 and the second electrode of the driving transistor M1. The third reset module 60 is used to transmit, in the reset stage T', a third initialization signal of the third initialization terminal Vin3 to the second electrode of the driving transistor M1 in response to a fourth scanning signal of the fourth scanning terminal Gate4, so as to reset the second electrode of the driving transistor M1.

In some specific embodiments, the third reset module 60 includes a third reset transistor M8. The third reset transistor M8 has a first electrode electrically connected to the second electrode of the driving transistor M1, a gate electrode electrically connected to the fourth scanning terminal Gate4, and a second electrode electrically connected to the third initialization terminal Vin3.

In embodiments of the present disclosure, each of the first reset transistor M2 and the first gating transistor M3 is a first-type transistor, and each of the first input transistor M4 and the third reset transistor M8 is a second-type transistors. Detailed descriptions of the first-type transistor and the second-type transistor may refer to the aforementioned embodiments, which will not be repeated here.

Three solutions for the data writing stage T in a case of the 8T1C structure of the pixel circuit in embodiments of the present disclosure will be described below with reference to FIG. 6*a* to FIG. 6*c*.

In some specific embodiments, none of the first sub-stage T1, the second sub-stage T2 and the third sub-stage T3 overlaps with the reset stage T'.

As shown in FIG. 6*a*, in some specific embodiments, the Y data writing stages T do not overlap with each other. In the $y^{th}$ data writing stage T, the first sub-stage T1 does not overlap with the second sub-stage T2, and the third sub-stage T3 is within the second sub-stage T2.

In embodiments of the present disclosure, a fourth scanning signal is provided to the fourth scanning terminal Gate4, and the reset stage T' starts. At this time, the third reset transistor M8 is turned on, and the third initialization signal of the third initialization terminal Vin3 is transmitted to the second electrode of the driving transistor M1 through the third reset transistor M8.

After the reset stage T' reaches a predetermined duration, the inactive level signal is provided to the fourth scanning terminal Gate4. At this time, the third reset transistor M8 is turned off, and the reset stage T' ends.

Then, the process enters the first sub-stage T1 in the data writing stage T. In the first sub-stage T1, the first scanning signal is provided to the first scanning terminal Gate1. At this time, the first reset transistor M2 is turned on, and the first initialization signal of the first initialization terminal is transmitted to the gate electrode of the driving transistor M1 and written to the storage capacitor C.

After the first sub-stage T1 reaches the predetermined duration, the inactive level signal is provided to the first scanning terminal Gate1. At this time, the first reset transistor M2 is turned off and the first sub-stage T1 ends. After that, the second scanning signal is provided to the second scanning terminal Gate2, and the second sub-stage T2 starts. At this time, the first gating transistor M3 is turned on, the gate electrode and the first electrode of the driving transistor M1 are conducted, and the threshold voltage of the driving transistor M1 is written to the storage capacitor C.

Before the end of the second sub-stage T2, the third scanning signal is provided to the third scanning terminal Gate3, that is, the third sub-stage T3 starts. At this time, the first input transistor M4 is turned on, and the data signal is transmitted to the gate electrode of the driving transistor M1 through the driving transistor M1 and the first gating transistor M3, and written to the storage capacitor C.

After the third sub-stage T3 reaches the predetermined duration, the inactive level signal is provided to the third scanning terminal Gate3. At this time, the first input transistor M4 is turned off, and the third sub-stage T3 ends.

After the second sub-stage T2 reaches the predetermined duration, the inactive level signal is provided to the second scanning terminal Gate2. At this time, the first gating transistor M3 is turned off, and the second sub-stage T2 ends.

After the completion of the last data writing stage T, the process may enter the light emitting stage E.

In some specific embodiments, a number of times of performing the reset stage T' is greater than or equal to a number of times of performing the data writing stage T.

In some specific embodiments, the $X^{th}$ frame period further includes the light emitting stage E following the $Y^{th}$ data writing stage T, and at least one reset stage T' is provided between the $Y^{th}$ data writing stage T and the light emitting stage E, so that the potential of the second electrode of the driving transistor M1 may be reset using the third initialization signal of the third initialization terminal Vin3 before the process enters the light emitting stage E, which may help the driving transistor M1 to output a more stable driving current signal in the light emitting stage E.

Figure 6B:
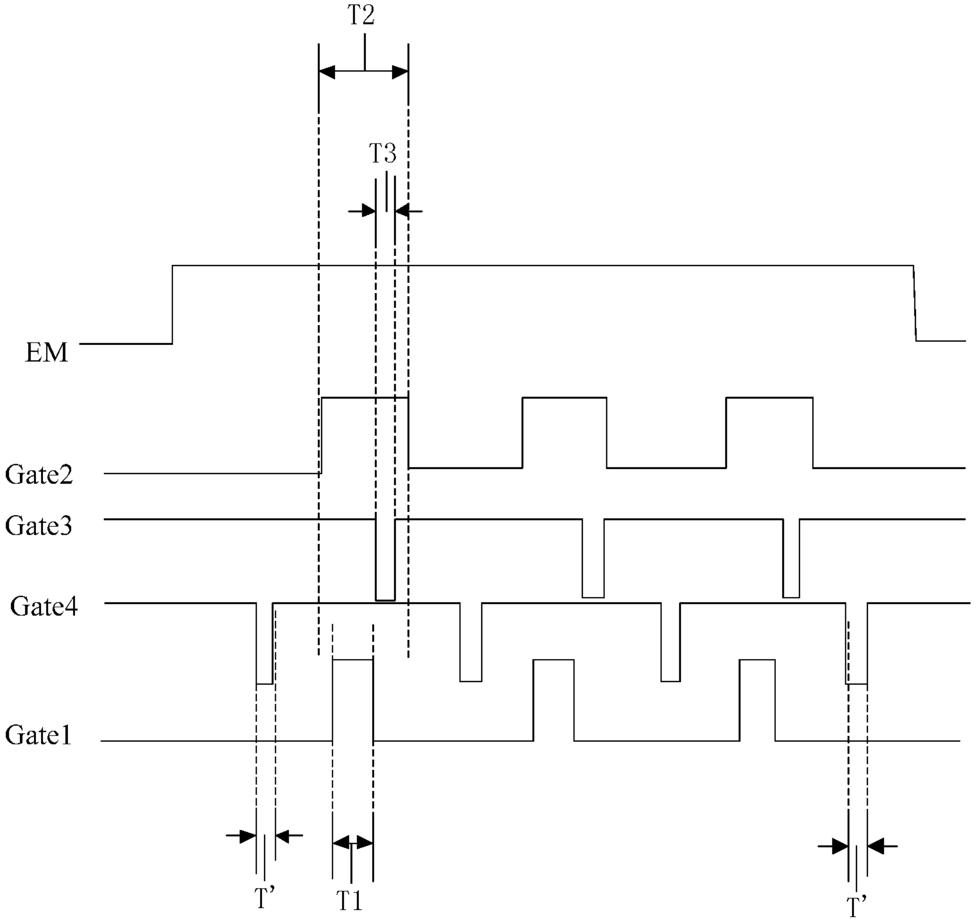
FIG. 6*b* schematically shows a fifth driving timing diagram of the pixel circuit in embodiments of the present disclosure.

FIG. 6*b* schematically shows a fifth driving timing diagram of the pixel circuit in embodiments of the present disclosure. As shown in FIG. 6*b*, in some specific embodiments, the Y data writing stages T do not overlap with each other; in the $y^{th}$ data writing stage T, the first sub-stage T1 overlaps partially with the second sub-stage T2, the third sub-stage T3 is within the second sub-stage T2, and the third sub-stage T3 does not overlap with the first sub-stage T1.

In embodiments of the present disclosure, the fourth scanning signal is provided to the fourth scanning terminal Gate4, and the reset stage T' starts. At this time, the third reset transistor M8 is turned on, and the third initialization signal of the third initialization terminal Vin3 is transmitted to the second electrode of the driving transistor M1 through the third reset transistor M8.

After the reset stage T' reaches the predetermined duration, the inactive level signal is provided to the fourth scanning terminal Gate4. At this time, the third reset transistor M8 is turned off, and the reset stage T' ends.

Then, the process enters the first sub-stage T1 of the data writing stage T. In the first sub-stage T1, the first scanning signal is provided to the first scanning terminal Gate1. At this time, the first reset transistor M2 is turned on, and the first initialization signal of the first initialization terminal is transmitted to the gate electrode of the driving transistor M1 and written to the storage capacitor C.

Before the end of the first sub-stage T1, the second scanning signal is provided to the second scanning terminal Gate2, and the second sub-stage T2 starts. At this time, the first gating transistor M3 is turned on, the gate electrode and the first electrode of the driving transistor M1 are conducted, and the threshold voltage of the driving transistor M1 is written to the storage capacitor C. When the first sub-stage T1 reaches the predetermined duration, the inactive level signal is provided to the first scanning terminal Gate1. At this time, the first reset transistor M2 is turned off, and the first sub-stage T1 ends.

After the end of the first sub-stage T1 and before the end of the second sub-stage T2, the third scanning signal is provided to the third scanning terminal Gate3, that is, the third sub-stage T3 starts. At this time, the first input transistor M4 is turned on, and the data signal is transmitted to the gate electrode of the driving transistor M1 through the driving transistor M1 and the first gating transistor M3, and written to the storage capacitor C.

After the third sub-stage T3 reaches the predetermined duration, the inactive level signal is provided to the third scanning terminal Gate3. At this time, the first input transistor M4 is turned off, and the third sub-stage T3 ends.

After the second sub-stage T2 reaches the predetermined duration, the inactive level signal is provided to the second scanning terminal Gate2. At this time, the first gating transistor M3 is turned off, and the second sub-stage T2 ends.

After the completion of the last data writing stage T, the reset stage T' may be performed for one more time, and then the process enters the light emitting stage E.

Figure 6C:
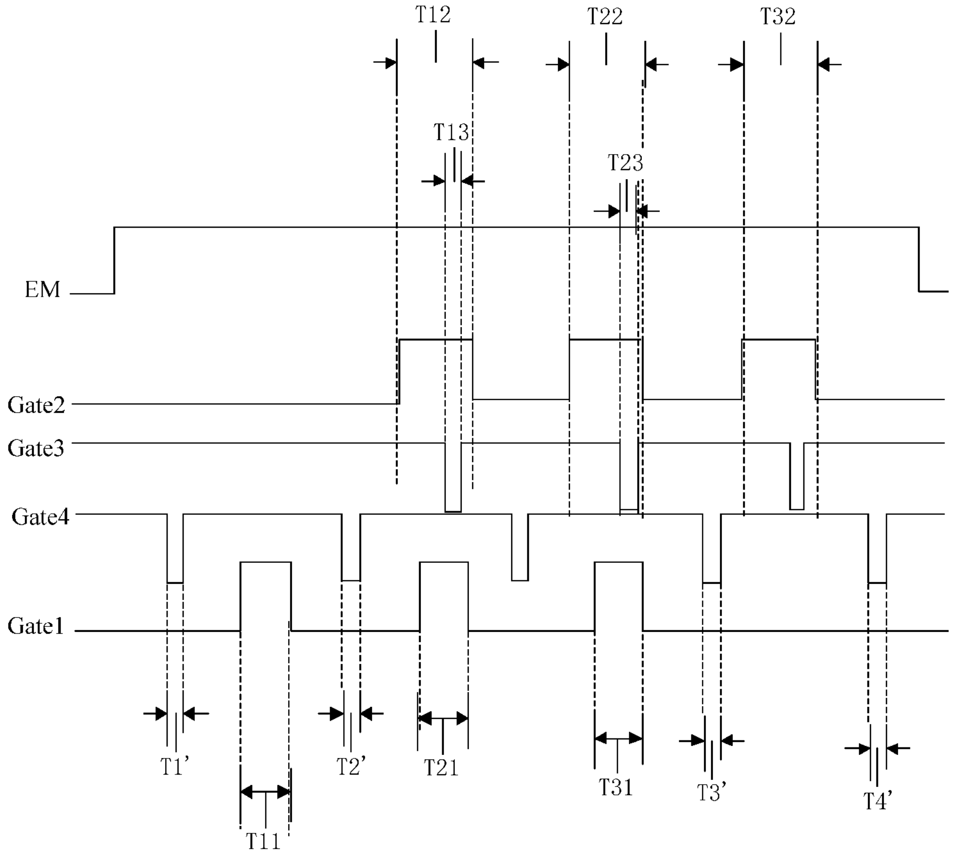
FIG. 6*c* schematically shows a sixth driving timing diagram of the pixel circuit in embodiments of the present disclosure.

FIG. 6*c* schematically shows a sixth driving timing diagram of the pixel circuit in embodiments of the present disclosure. As shown in FIG. 6*c*, in some specific embodiments, the third sub-stage T23 in the $y^{th}$ data writing stage T is within the second sub-stage T22 in the $y^{th}$ data writing stage T, the first sub-stage T21 in the $y^{th}$ data writing stage T does not overlap with the second sub-stage 22 in the $y^{th}$ data writing stage T, and the first sub-stage T21 in the $y^{th}$ data writing stage T overlaps at least partially with the second sub-stage T12 and the third sub-stage T13 in the $(y-1)^{th}$ data writing stage T.

In embodiments of the present disclosure, the fourth scanning signal is provided to the fourth scanning terminal Gate4, and a $(y-1)^{th}$ reset stage T1' starts. At this time, the third reset transistor M8 is turned on, and the third initialization signal of the third initialization terminal Vin3 is transmitted to the second electrode of the driving transistor M1 through the third reset transistor M8.

After the (y−1)$^{th}$ reset stage T1' reaches a predetermined duration, the inactive level signal is provided to the fourth scanning terminal Gate4. At this time, the third reset transistor M8 is turned off, and the (y−1)$^{th}$ reset stage T1' ends.

Then, the process enters the first sub-stage T11 in the (y−1)$^{th}$ data writing stage T. In embodiments of the present disclosure, in the first sub-stage T11 in the (y−1)$^{th}$ data writing stage T, the first scanning signal is provided to the first scanning terminal Gate1. At this time, the first reset transistor M2 is turned on, and the first initialization signal of the first initialization terminal Vin1 is transmitted to the gate electrode of the driving transistor M1 and written to the storage capacitor C.

After the first sub-stage T11 reaches the predetermined duration, the inactive level signal is provided to the first scanning terminal Gate1. At this time, the first reset transistor M2 is turned off, and the first sub-stage T11 in the (y−1)$^{th}$ data writing stage T ends.

Then, the fourth scanning signal is provided to the fourth scanning terminal Gate4, and a y$^{th}$ reset stage T2' starts. At this time, the third reset transistor M8 is turned on, and the third initialization signal of the third initialization terminal Vin3 is transmitted to the second electrode of the driving transistor M1 through the third reset transistor M8.

After the y$^{th}$ reset stage T2' reaches the predetermined duration, the inactive level signal is provided to the fourth scanning terminal Gate4. At this time, the third reset transistor M8 is turned off, and the y$^{th}$ reset stage T2' ends.

Then, the second scanning signal is provided to the second scanning terminal Gate2, and the second sub-stage T12 in the (y−1)$^{th}$ data writing stage T starts. At this time, the first gating transistor M3 is turned on, the gate electrode and the first electrode of the driving transistor M1 are conducted, and the threshold voltage of the driving transistor M1 is written to the storage capacitor C.

Before the end of the second sub-stage T12 in the (y−1)$^{th}$ data writing stage T, the first scanning signal is provided again to the first scanning terminal Gate1, and the first sub-stage T21 in the y$^{th}$ data writing stage T starts. At this time, the first reset transistor M2 is turned on, and the first initialization signal of the first initialization terminal Vin1 is transmitted to the gate electrode of the driving transistor M1 and written to the storage capacitor C.

Before the end of the second sub-stage T12 in the (y−1)$^{th}$ data writing stage T and the end of the first sub-stage T21 in the y$^{th}$ data writing stage T, the third scanning signal is provided to the third scanning terminal Gate3, that is, the third sub-stage T3 in the (y−1)$^{th}$ data writing stage T starts. At this time, the first input transistor M4 is turned on, and the data signal is transmitted to the gate electrode of the driving transistor M1 through the driving transistor M1 and the first gating transistor M3, and is written to the storage capacitor C.

After the third sub-stage T13 in the (y−1)$^{th}$ data writing stage T reaches the predetermined duration, the inactive level signal is provided to the third scanning terminal Gate3. At this time, the first input transistor M4 is turned off, and the third sub-stage T13 in the (y−1)$^{th}$ data writing stage T ends.

After the second sub-stage T12 in the (y−1)$^{th}$ data writing stage T reaches the predetermined duration, the inactive level signal is provided to the second scanning terminal Gate2. At this time, the first gating transistor M3 is turned off, and the second sub-stage T12 in the (y−1)$^{th}$ data writing stage T ends.

In some specific embodiments, the second sub-stage T32 in the Y$^{th}$ data writing stage T does not overlap with the first sub-stage (T11, T21 and T31) in any of the Y data writing stages T, so that the data signal finally written in the last data writing stage T is not interfered by the first initialization signal.

In some specific embodiments, at least one reset stage T3' is performed between the second sub-stage T22 in the (Y−1)$^{th}$ data writing stage T and the second sub-stage T32 in the Y$^{th}$ data writing stage T.

After the completion of the last data writing stage T, the reset stage T4' may be performed for one more time, and then the process enters the light emitting stage E.

It should be noted that the driving timing shown in FIG. 6*a* to FIG. 6*c* mainly differs from the driving timing shown in FIG. 2, FIG. 4*a* and FIG. 4*b* in that the driving timing of the fourth scanning terminal Gate4 is added. The driving timing of the first scanning terminal Gate1, the second scanning terminal Gate2 and the third scanning terminal Gate3 shown in FIG. 6*a* to FIG. 6*c* is substantially the same as that shown in FIG. 2, FIG. 4*a* and FIG. 4*b*. Accordingly, detailed descriptions of the driving timing of the first scanning terminal Gate1, the second scanning terminal Gate2 and the third scanning terminal Gate3 may refer to the aforementioned embodiments, which will not be repeated here.

With the pixel circuit in embodiments of the present disclosure, the reset operations, threshold compensation operations and data writing operations may be performed on the pixel circuit for multiple times in a frame period, thus improving the Hole Mura and improving the display effect. Furthermore, experiments show that ghost and trail may also be improved to some extent by the above-mentioned methods, as specifically shown in Table 1.

TABLE 1

| Title | Hole Mura | Ghost 0 seconds/10 seconds | Trail (%) W/R/G/B |
|---|---|---|---|
| Traditional pixel circuit | Level 2 | 7.0/1.7 | 25/15/26/63 |
| Pixel circuit of the present disclosure in which a first solution of data writing stage T is adopted | Level 0.5 | 5.8/1.6 | 65/47/70/89 |
| Pixel circuit of the present disclosure in which a second solution of data writing stage T is adopted | Level 0.5 | 5.8/1.6 | 64/48/69/88 |
| Pixel circuit of the present disclosure in which a third solution of data writing stage T is adopted | Level 0 | 5.6/1.5 | 66/50/72/92 |

Figure 7:
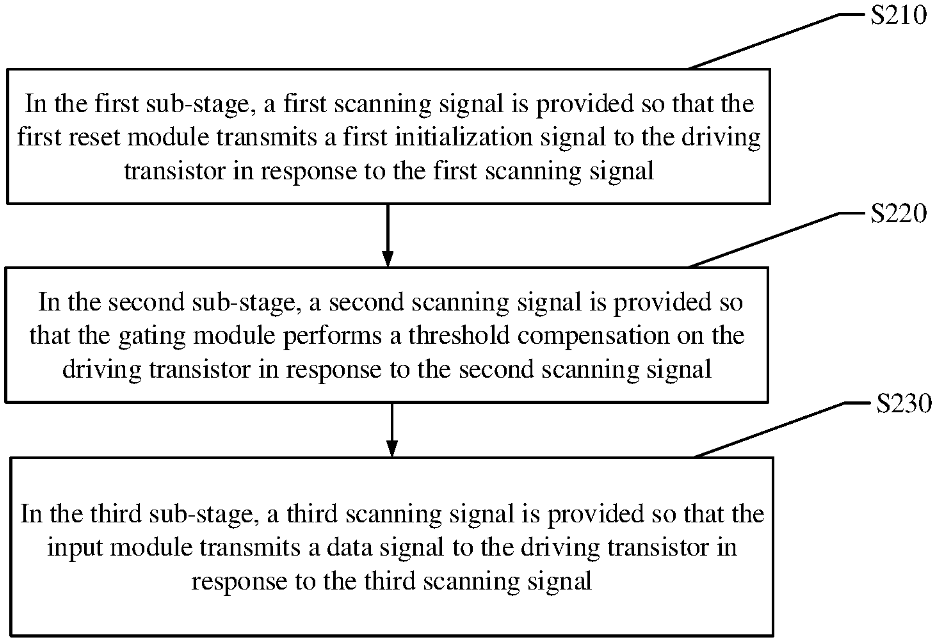
FIG. 7 schematically shows a flowchart of a driving method of embodiments of the present disclosure.

Embodiments of the present disclosure further provide a method of driving a pixel circuit. The method includes: controlling a driving circuit in an X$^{th}$ frame period so that the driving circuit drives a light emitting device L electrically connected to the driving circuit to emit light. The X$^{th}$ frame period includes Y data writing stages T and Z light emitting stages. A y$^{th}$ data writing stage T in the Y data writing stages T includes a first sub-stage, a second sub-stage and a third sub-stage. The pixel circuit includes a first reset module, a gating module, and an input module. FIG. 7 schematically shows a flowchart of the driving method of embodiments of the present disclosure. As shown in FIG. 7, the driving method of embodiments of the present disclosure includes steps S210 to S230.

It should be noted that although the steps in the figures are shown in an order indicated by arrows, these steps are not necessarily executed in the order indicated by the arrows. Unless explicitly stated, the execution of these steps is not strictly limited in order, and these steps may be executed in a different order. Moreover, at least some of the steps in the figures may include a plurality of sub-steps or a plurality of stages. These sub-steps or stages are not necessarily completed at the same time, but may be executed at different times. The execution order is not necessarily sequential, but may be executed alternately with other steps or at least part of sub-steps or stages of other steps.

In step S210, in the first sub-stage, a first scanning signal is provided so that the first reset module 10 transmits a first initialization signal to the driving transistor M1 in response to the first scanning signal.

For example, a first electrode of the driving transistor M1 is electrically connected to the light emitting device L. The first reset module 10 is electrically connected to a gate electrode of the driving transistor M1, a first scanning terminal Gate1 and a first initialization terminal Vin1. In the first sub-stage, the first scanning signal is provided to the first scanning terminal Gate1, so that the first reset module 10 transmits an initialization signal of the first initialization terminal to the gate electrode of the driving transistor M1 in response to the first scanning signal of the first scanning terminal Gate1.

In step S220, in the second sub-stage, a second scanning signal is provided so that the gating module 20 performs a threshold compensation on the driving transistor M1 in response to the second scanning signal.

For example, the gating module 20 is electrically connected to the second scanning terminal Gate2, the first electrode of the driving transistor M1, and the gate electrode of the driving transistor M1. In the second sub-stage, the second scanning signal is provided to the second scanning terminal Gate2 so that the gating module 20 conducts the gate electrode of the driving transistor M1 and the first electrode of the driving transistor M1 to perform the threshold compensation on the driving transistor M1 in response to the second scanning signal of the second scanning terminal Gate2.

In step S230, in the third sub-stage, a third scanning signal is provided so that the input module 30 transmits a data signal to the driving transistor M1 in response to the third scanning signal.

For example, the input module 30 is electrically connected to the second electrode of the driving transistor M1, the third scanning terminal Gate3 and the data signal terminal Data. In the third sub-stage, the third scanning signal is provided to the third scanning terminal Gate3 so that the input module 30 transmits the data signal of the data signal terminal Data to the second electrode of the driving transistor M1 in response to the third scanning signal of the third scanning terminal Gate3.

X, Y and y are all positive integers, and y is less than or equal to Y.

In embodiments of the present disclosure, for a pixel circuit, a frame period includes a plurality of data writing stages T, and each data writing stage T may include the first sub-stage T1, the second sub-stage T2 and the third sub-stage T3 for achieving the reset, threshold compensation and target data writing operations. In this way, the gate potential of the driving transistor M1 may be reset several times in a frame period. The experiments show that an influence of the small load on the wire on the voltage value finally written to the gate electrode of the driving transistor M1 may be significantly reduced. Then the voltage value finally written to the gate electrode of the driving transistor M1 may approach or even reach a target value, so that the Hole Mura may be significantly improved to be invisible to naked eyes.

Embodiments of the present disclosure further provide a display panel, which includes the pixel circuit described above.

In some specific embodiments, the display panel includes a plurality of rows and a plurality of columns of pixel circuits. The plurality of rows of pixel circuits include a plurality of groups, each group includes adjacent z rows of pixel circuits, and a group of pixel circuits share a second scanning terminal Gate2, where z is a positive integer.

In embodiments of the present disclosure, z may be set to 2. In other words, each group of pixel circuits includes two adjacent rows of pixel circuits, thereby saving the number of signal lines. In this way, the two rows of pixel circuits may enter the second stage in response to the second scanning signal provided by the same second scanning terminal Gate2. In this case, it is needed to adjust the second scanning signal provided by the second scanning terminal Gate2 so that the third stage of the two rows of pixel circuits is in the same second stage.

Embodiments of the present disclosure further provide a display device including the display substrate as described above.

In other embodiments of the present disclosure, examples of the display device include a tablet personal computer (PC), a smart phone, a personal digital assistant (PDA), a portable multimedia player, a game console, or a wrist watch-type electronic device, etc. However, embodiments of the present disclosure are not intended to limit the type of the display device. In some exemplary embodiments, the display device may be used not only in a large electronic device such as a television (TV) or an external billboard, but also in a medium or small electronic device such as a PC, a laptop computer, a vehicle navigation device or a camera.

Those skilled in the art may understand that various embodiments of the present disclosure and/or features described in the claims may be combined in various ways, even if such combinations are not explicitly described in the present disclosure. In particular, the various embodiments of the present disclosure and/or the features described in the claims may be combined in various ways without departing from the spirit and teachings of the present disclosure. All these combinations fall within the scope of the present disclosure.

Embodiments of the present disclosure have been described above. However, these embodiments are for illustrative purposes only, and are not intended to limit the scope of the present disclosure. Although various embodiments have been described separately above, this does not mean that measures in the various embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A pixel circuit, wherein the pixel circuit is configured to drive, in an $X^{th}$ frame period, a light emitting device electrically connected to the pixel circuit to emit light; the $X^{th}$ frame period comprises Y data writing stages and Z light emitting stages, a $y^{th}$ data writing stage in the Y data writing stages comprises a first sub-stage, a second sub-stage and a third sub-stage, and the pixel circuit comprises:

a driving transistor;

a first reset module electrically connected to the driving transistor, wherein the first reset module is configured to transmit, in the first sub-stage, a first initialization signal to the driving transistor in response to a first scanning signal;

a gating module electrically connected to the driving transistor, wherein the gating module is configured to perform, in the second sub-stage, a threshold compensation on the driving transistor in response to a second scanning signal; and an input module electrically connected to the driving transistor, wherein the input module is configured to transmit, in the third sub-stage, a data signal to the driving transistor in response to a third scanning signal;

wherein X, Y, Z and y are positive integers, y is less than or equal to Y, and Y is greater than Z;

wherein the $X^{th}$ frame period further comprises a plurality of reset stages, and each data writing stage follows at least one reset stage; and wherein the pixel circuit further comprises a third reset module, the third reset module is electrically connected to a fourth scanning terminal, a third initialization terminal and a second electrode of the driving transistor, and the third reset module is configured to: transmit, in the reset stage, a third initialization signal of the third initialization terminal to the second electrode of the driving transistor in response to a fourth scanning signal of the fourth scanning terminal.

2. The pixel circuit according to claim 1, wherein the first reset module comprises a first reset transistor, the gating module comprises a first gating transistor, and the input module comprises a first input transistor;

the first reset transistor has a first electrode electrically connected to a gate electrode of the driving transistor and a first electrode of the first gating transistor, a gate electrode electrically connected to a first scanning terminal configured to provide the first scanning signal, and a second electrode electrically connected to a first initialization terminal configured to provide the first initialization signal;

the first gating transistor has a gate electrode electrically connected to a second scanning terminal configured to provide the second scanning signal, and the first electrode electrically connected to a first electrode of the driving transistor;

the first input transistor has a first electrode electrically connected to a second electrode of the driving transistor, a gate electrode electrically connected to a third scanning terminal configured to provide the third scanning signal, and a second electrode electrically connected to a data signal terminal configured to provide the data signal.

3. The pixel circuit according to claim 2, wherein each of the first reset transistor and the first gating transistor is a first-type transistor, the first input transistor is a second-type transistor, and the first-type transistor is different from the second-type transistor in terms of transistor type.

4. The pixel circuit according to claim 1, wherein the Y data writing stages do not overlap with each other, and in the $y^{th}$ data writing stage:

the first sub-stage does not overlap with the second sub-stage; and the third sub-stage is within the second sub-stage.

5. The pixel circuit according to claim 1, wherein the Y data writing stages do not overlap with each other, and in the $y^{th}$ data writing stage:

the first sub-stage overlaps partially with the second sub-stage; and the third sub-stage is within the second sub-stage, and the third sub-stage does not overlap with the first sub-stage.

6. The pixel circuit according to claim 1, wherein, the third sub-stage in the $y^{th}$ data writing stage is within the second sub-stage in the $y^{th}$ data writing stage;

the first sub-stage in the $y^{th}$ data writing stage does not overlap with the second sub-stage in the $y^{th}$ data writing stage; and the first sub-stage in the $y^{th}$ data writing stage overlaps at least partially with the second sub-stage and the third sub-stage in a $(y-1)^{th}$ data writing stage.

7. The pixel circuit according to claim 1, wherein y is less than Y, and the second sub-stage in the $Y^{th}$ data writing stage does not overlap with the first sub-stage in any of the Y data writing stages.

8. The pixel circuit according to claim 1, wherein the pixel circuit further comprises a light-emission control module, the light-emission control module is electrically connected to a light-emission control terminal, a first voltage terminal, a second electrode of the driving transistor, a first electrode of the driving transistor and the light emitting device, and the light-emission control module is configured to:

transmit, in the light emitting stage, a first voltage signal of the first voltage terminal to the second electrode of the driving transistor and conduct the first electrode of the driving transistor to the light emitting device, in response to a light-emission control signal of the light-emission control terminal.

9. The pixel circuit according to claim 8, wherein the light-emission control module comprises a first light-emission control transistor and a second light-emission control transistor;

the first light-emission control transistor has a first electrode electrically connected to the second electrode of the driving transistor, a gate electrode electrically connected to the light-emission control terminal, and a second electrode electrically connected to the first voltage terminal; and the second light-emission control transistor has a first electrode electrically connected to a second electrode of the light emitting device, a gate electrode electrically connected to the light-emission control terminal, and a second electrode electrically connected to the first electrode of the driving transistor.

10. The pixel circuit according to claim 1, wherein the light emitting device has a first electrode electrically connected to a second voltage terminal, the pixel circuit further comprises a second reset module, the second reset module is electrically connected to a second initialization terminal, the third scanning terminal and a second electrode of the light emitting device, and the second reset module is configured to:

transmit, in the third sub-stage, a second initialization signal of the second initialization terminal to the second electrode of the light emitting device in response to a third scanning signal of the third scanning terminal.

11. The pixel circuit according to claim 10, wherein the second reset module comprises a second reset transistor;

the second reset transistor has a first electrode electrically connected to the second electrode of the light emitting device, a gate electrode electrically connected to the third scanning terminal, and a second electrode electrically connected to the second initialization terminal.

12. The pixel circuit according to claim 1, wherein the third reset module comprises a third reset transistor;

the third reset transistor has a first electrode electrically connected to the second electrode of the driving transistor, a gate electrode electrically connected to the fourth scanning terminal, and a second electrode electrically connected to the third initialization terminal.

13. The pixel circuit according to claim 12, wherein the first reset module comprises a first reset transistor, the gating module comprises a first gating transistor, and the input module comprises a first input transistor;

the first reset transistor has a first electrode electrically connected to a gate electrode of the driving transistor and a first electrode of the first gating transistor, a gate electrode electrically connected to the first scanning terminal, and a second electrode electrically connected to the first initialization terminal;

the first gating transistor has a gate electrode electrically connected to the second scanning terminal, and a first electrode electrically connected to a first electrode of the driving transistor;

the first input transistor has a first electrode electrically connected to a second electrode of the driving transistor, a gate electrode electrically connected to the third scanning terminal, and a second electrode electrically connected to the data signal terminal;

each of the first reset transistor and the first gating transistor is a first-type transistor, each of the first input transistor and the third reset transistor is a second-type transistor, and the first-type transistor is different from the second-type transistor in terms of transistor type.

14. The pixel circuit according to claim 1, wherein none of the first sub-stage, the second sub-stage and the third sub-stage overlaps with the reset stage.

15. The pixel circuit according to claim 1, wherein the $X^{th}$ frame period further comprises a light emitting stage following a $Y^{th}$ data writing stage, and at least one reset stage is provided between the $Y^{th}$ data writing stage and the light emitting stage.

16. The pixel circuit according to claim 1, wherein at least one reset stage is provided between the second sub-stage in a $(Y-1)^{th}$ data writing stage and the second sub-stage in a $Y^{th}$ data writing stage;

wherein Y is greater than or equal to 3.

17. A display panel, comprising the pixel circuit of claim 1.

18. A display device, comprising the display substrate of claim 17.

19. A method of driving a pixel circuit, wherein the pixel circuit is configured to drive, in an $X^{th}$ frame period, a light emitting device electrically connected to the pixel circuit to emit light; the $X^{th}$ frame period comprises Y data writing stages and Z light emitting stages, a $y^{th}$ data writing stage in the Y data writing stages comprises a first sub-stage, a second sub-stage and a third sub-stage, the pixel circuit comprises a first reset module, a gating module and an input module, and the method comprises:

in the first sub-stage, providing a first scanning signal, so that the first reset module transmits a first initialization signal to the driving transistor in response to the first scanning signal;

in the second sub-stage, providing a second scanning signal, so that the gating module performs a threshold compensation on the driving transistor in response to the second scanning signal; and in the third sub-stage, providing a third scanning signal, so that the input module transmits a data signal to the driving transistor in response to the third scanning signal;

wherein X, Y, Z and y are positive integers, y is less than or equal to Y, and Y is greater than Z;

wherein the $X^{th}$ frame period further comprises a plurality of reset stages, and each data writing stage follows at least one reset stage; and wherein the pixel circuit further comprises a third reset module, the third reset module is electrically connected to a fourth scanning terminal, a third initialization terminal and a second electrode of the driving transistor, and the third reset module is configured to: transmit, in the reset stage, a third initialization signal of the third initialization terminal to the second electrode of the driving transistor in response to a fourth scanning signal of the fourth scanning terminal.

* * * * *